United States Patent Office 2,992,205
Patented July 11, 1961

2,992,205
POLYETHYLENE CONTAINING HIGHER ALKYL IMIDAZOLINE AND LACTATE DERIVATIVES
Margaret H. Broyles and Roger E. Gibson, Kingsport, Tenn., assignors to Eastman Kodak Company, Rochester, N.Y., a corporation of New Jersey
No Drawing. Filed May 11, 1959, Ser. No. 812,114
5 Claims. (Cl. 260—45.8)

This application relates to polyethylene compositions of improved properties. Specific aspects of this invention relate to polyethylene compositions, particularly in film form, having improved properties with respect to blocking and coefficient of friction.

One of the major problems in the handling of thin films of polyethylene is their high film-to-film coefficient of friction which often prevents the feeding of single sheets to automatic packaging equipment. Another problem encountered in the handling of thin films of polyethylene is the tendency for these films to block. Blocking is the adherence of two or more film surfaces to each other while stacked under pressure.

It is an object of this invention to provide a novel polyethylene composition which possesses reduced film-to-film coefficient of friction.

It is another object of this invention to provide a new polyethylene composition which, upon conversion into films and sheets, possesses improved resistance to blocking.

Other objects of this invention will be apparent from the detailed description appearing hereinbelow.

The present invention comprises polyethylene compositions having incorporated therein minor proportionate amounts of a higher alkyl imidazoline or its lactate derivative.

The higher alkyl imidazoline additive of the invention can be prepared by reacting at an elevated temperature ethylene-diamine with an equal molar proportion of a fatty acid as represented by the following equation:

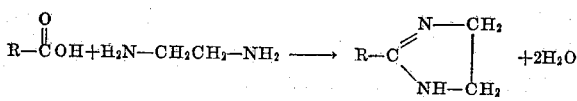

wherein R is an alkyl radical having 7 to 17 carbon atoms. The preferred fatty acid employed to prepare the subject higher alkyl imidazoline is lauric acid although other fatty acids such as caprylic acid, pelargonic acid, capric acid, hendecanoic acid, myristic acid, palmitic acid, stearic acid and the like can also be utilized to prepare the subject useful additives. The higher alkyl imidazoline lactates of the invention can be prepared by reacting one molar proportion of the above described higher alkyl imidazoline with one half molar proportion of lactide and and one molar proportion of water as represented by the following equation:

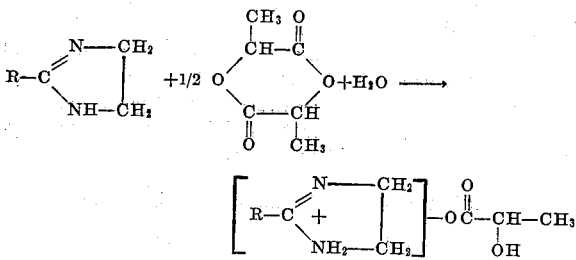

In general, the proportion of higher alkyl imidazoline or its lactate derivative used in polyethylene compositions to achieve the improved results of the invention is about 0.01% to 0.5%, and preferably 0.05% to 0.2%, based on the weight of the polyethylene.

Any of the known normally-solid, film-forming polyethylene compositions can be improved in accordance with the invention, including "low density" and "high density" polyethylene. The polyethylene compositions improved with the subject additives in accordance with the invention are normally solid resins having average molecular weights of at least 15,000 and usually at least 18,000 as distinguished from lower molecular weight polyethylene waxes.

The present polyethylene compositions can be prepared by any method suitable for insuring a substantially uniform mixture of polyethylene and the subject additives in the final fabricated article. These additives can be conveniently incorporated into the polyethylene by melt blending the ingredients in conventional apparatus, such as a Banbury mixer, heated rolls, a plasticator, or in combinations thereof.

One of the advantages of polyethylene compositions containing higher alkyl imidazolines and their lactate derivative is that such compositions allow the production of films, sheets, and the like having reduced coefficients of friction. Such a reduced coefficient of friction facilitates many commercial operations, such as the feeding of polyethylene films or sheets into packaging apparatus, for example.

Another advantage achieved by the use of small amounts of the subject higher alkyl imidazolines or ther lactate derivative in polyethylene is in that films of polyethylene containing these additives have a reduced tendency toward blocking, namely, a reduced tendency of two or more films of the polyethylene from adhering to one another while stacked under pressure.

Although the compositions of this invention are composed essentially of polyethylene containing small amounts of higher alkyl imidazolines and their lactate derivative, the compositions may also contain small amounts of other desirable additives, such as high melting waxes, antioxidants, dyes and pigments, antistatic agents, and the like, provided the additional ingredients are not present in amounts sufficient to alter the efficacy of the subject additive.

The polyethylene compositions herein disclosed and claimed are particularly useful in unsupported plastic or resinous films having thicknesses of 0.02 to 100 mils and particularly of 0.02 to 5 mils.

The invention is illustrated by the following examples of preferred embodiments thereof.

EXAMPLE 1

Undecylimidazoline and undecylimidazoline lactate in varying amounts were incorporated into polyethylene having an average molecular weight of about 19,800 and a density of about 0.923. The undecylimidazoline and undecylimidazoline lactate were dissolved in isopropyl alcohol at a concentration of 1% and coated on the surface of pellets of the polyethylene. The isopropyl alcohol was removed by drying in a circulating air oven at about 50° C. and then extruded at a temperature of 320° F. into tubular films approximately 1.5 mils in thickness. Samples of the films containing the additives were tested for slip or coefficient of friction and resistance to blocking. The results of the tests are summarized by the data set out in the table below.

Table

| Additive | Concn., percent | Coefficient of Friction | Blocking Index |
|---|---|---|---|
| None | 0 | 0.86 | 5 |
| Undecylimidazoline | 0.05 | 0.46 | 3 |
| Do | 0.15 | 0.37 | 3 |
| Do | 0.2 | 0.31 | 2 |
| Undecylimidazoline lactate | 0.2 | 0.33 | 2 |

EXAMPLE 2

For comparative purposes another nitrogen-containing compound N,N'-ethylene distearamide at a concentration of 0.2% was tested in films of polyethylene described in Example 1 and these films were found to have a coefficient of friction greater than 0.6. Several other nitrogen-containing additives at a concentration of 0.1% in films of the polyethylene were also found to have coefficients of friction greater than 0.6, including: N-ethyl oleamide, N-n-butyl oleamide and N-methyl stearamide.

Films of polyethylene having coefficients of friction greater than about 0.6 generally cause difficulty when used with automatic packaging and folding equipment. As can be observed from the data set out in the above table, the addition to polyethylene of small amounts of the subject higher alkyl imidazolines and lactate derivatives thereof decreases the coefficient of friction of polyethylene well below 0.6.

To determine the coefficient of friction values referred to in Example 1 and in Example 2, a strip of the polyethylene film was pulled underneath a flat-bottomed block or "sled" weighing 50 grams having a film of the polyethylene fastened around it at a constant speed of 10 feet per minute. The block was fastened to a load measuring device which indicated the resistance the block offered to the film being pulled underneath it. The coefficient of friction was calculated by dividing the weight of the block into the observed load. The test samples were conditioned for at least one hour at a temperature of 73.4° F. and at a relative humidity of 50% prior to testing.

To determine the blocking index values set out in the above table four inch square samples of the polyethylene film were stacked under a pressure of ⅓ p.s.i. and stored in an oven at 122° F. for 24 hours. Thereafter the stacked films were cooled to room temperature for one half hour, the pressure removed and the ease of separation of the films evaluated in terms of blocking index which was determined as follows:

| Blocking Index | Description |
| --- | --- |
| 1 | No blocking. No adhesion between films. Films slide freely. |
| 2 | Very slight blocking. Films do not slide freely but can be made to slide by slight finger force. |
| 3 | Slight blocking. Films have to be peeled apart, but their surface remains intact. |
| 4 | Blocking. Films have to be peeled apart, this causing surface damage. |
| 5 | Severe blocking. Films cannot be separated. |

EXAMPLE 3.—PREPARATION OF UNDECYLIMIDAZOLINE

To a mixture of 2,000 grams (10 moles) of lauric acid and 2 liters of petroleum ether solvent was added 682 grams (10 moles) of ethylene diamine (88%). The resulting mixture was heated with stirring at 122° C. until the theoretical water of reaction (20 moles) had been removed. The solvent was stripped from the reaction mixture under high vacuum, the resulting reaction product taken up in isopropyl alcohol, 5% activated carbon added and the resulting mixture filtered at about 80° C. Acetone was added to the resulting filtrate and the filtrate cooled to precipitate out the product which was separated by filtration. The prepared undecylimidazoline product had a melting point of 153–158° C. The infrared spectrogram for the prepared product showed absorption bands characteristic of a secondary amine, a "C=N" grouping, a ring enclosure and a methylene chain.

EXAMPLE 4.—PREPARATION OF UNDECYLIMIDAZOLINE LACTATE

To about 2240 grams (10 moles) of the undecylimidazoline prepared as described above in a petroleum ether solvent was added 720 grams (5 moles) of lactide in 180 ml. (10 moles) of water. The resulting mixture was maintained at a temperature of about 110° C. for 30 minutes. The solvent was stripped from the resulting reaction mixture under high vacuum without addition of further heat. The resulting undecylimidazoline had a melting point of 123–129° C.

The polyethylene compositions of the invention have important improved properties which relate principally to the ease of separating contacting surfaces thereof. Hence, the polyethylene compositions of the invention have particular utility when used in stacks of films or sheets and rolls thereof, which in the absence of the additives such as those described herein, would block, adhere, or not slide easily apart.

Although the invention has been described in detail with reference to certain preferred embodiments thereof, it will be understood that variations and modifications can be effected within the spirit and scope of the invention as described hereinabove and as defined in the appended claims.

We claim:

1. A solid, film-forming plastic composition comprising polyethylene having an average molecular weight of at least 15,000 and containing 0.01% to 0.5% by weight based on the polyethylene of an imidazoline having a formula selected from the group consisting of

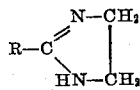

and

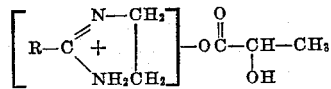

wherein R is an alkyl radical having 7 to 17 carbon atoms.

2. A plastic film 0.02 to 100 mils in thickness having substantially reduced film-to-film blocking characteristics and reduced coefficient of friction, said film comprising polyethylene having an average molecular weight of at least 18,000 and 0.01% to 0.5% by weight based on the polyethylene of undecylimidazoline.

3. A plastic film 0.02 to 100 mils in thickness having substantially reduced film-to-film blocking characteristics and reduced coefficient of friction, said film comprising polyethylene having an average molecular weight of at least 18,000 and 0.01% to 0.5% by weight based on the polyethylene of undecylimidazoline lactate.

4. A plastic film 0.02 to 5 mils in thickness having substantially reduced film-to-film blocking characteristics and reduced coefficient of friction, said film comprising polyethylene having an average molecular weight of at least 18,000 to 0.05% to 0.2% by weight based on the polyethylene of undecylimidazoline.

5. A plastic film 0.02 to 5 mils in thickness having substantially reduced film-to-film blocking characteristics and reduced coefficient of friction, said film comprising polyethylene having an average molecular weight of at least 18,000 and 0.05% to 0.2% by weight based on the polyethylene of undecylimidazoline lactate.

References Cited in the file of this patent

UNITED STATES PATENTS

| | | |
| --- | --- | --- |
| 2,155,877 | Waldmann et al. | Apr. 25, 1939 |
| 2,628,214 | Pinkney et al. | Feb. 10, 1953 |
| 2,727,879 | Vincent | Dec. 20, 1955 |